Nov. 26, 1940.   K. HEFEL   2,223,210
ELECTRIC TRANSMISSION GEARING
Filed Jan. 20, 1936    2 Sheets-Sheet 1

Karl Hefel
INVENTOR
By Otto Munk
his ATT'Y.

Nov. 26, 1940. K. HEFEL 2,223,210
ELECTRIC TRANSMISSION GEARING
Filed Jan. 20, 1936 2 Sheets-Sheet 2

Karl Hefel
INVENTOR
By Otto Kpunk
his ATTY.

Patented Nov. 26, 1940

2,223,210

UNITED STATES PATENT OFFICE 2,223,210

ELECTRIC TRANSMISSION GEARING

Karl Hefel, Innsbruck, Tyrol, Austria

Application January 20, 1936, Serial No. 59,871
In Austria January 23, 1935

4 Claims. (Cl. 172—239)

This invention relates to electric transmission gearing comprising two direct current machines with separate excitation, of which the first acts mainly as generator while the second acts mainly as a motor.

It is the main object of the invention to provide transmission gearing of this nature which, while being of constant high efficiency, enables the transmission ratio to be varied within very wide limits, which is of light weight and small dimensions so that it is very well suited for use in automobiles and other power-driven vehicles, and in which, finally, alteration of the transmission ratio is effected automatically on the mere operation of the means for controlling the driving motor, for example the engine of an automobile in dependence on the speed conditions and resistance to travel at any one time. Further features of the invention relate to means for starting and braking, and also for starting up the driving motor.

In accordance with the invention the one part (armature or field magnet system) of the one machine is coupled to the driving shaft and the other part to the driven shaft, while the one part (armature or field magnet system) of the second machine is coupled to the driven shaft and the other part is stationary; further, the armature windings of both machines are directly connected together to form a closed current circuit, and for varying the transmission ratio there are provided exclusively means for altering the field excitation of the second machine.

A form of construction embodying the invention is shown, by way of example, in the accompanying drawings, in which.

Figure 1:
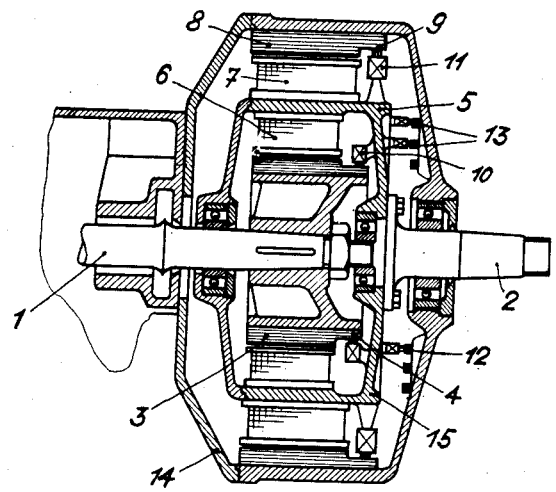
Fig. 1 is an axial section taken through the transmission gearing in accordance with the invention.

Referring to the drawings, 1 denotes the driving shaft, 2 the driven shaft, 3 the armature of the generator part, 4 the commutator of the latter, and 5 the common magnet yoke on which there are mounted the field winding of the generator part 6 and the field winding of the motor part 7. 8 denotes the armature of the motor part and 9 its commutator. 10 are the brushes of the generator part and 11 those of the motor part. The exciting current is fed to the field winding of the motor part through the slip rings 13, while the field winding of the generator part is fed through the slip ring 12. The return flow of the current takes place in this case, for instance, through ground. 14 denotes the stationary casing of the motor part, while the casing part 15 rotates with the driven shaft 2.

The armature windings of the two machines are directly connected together in circuit, without the interposition of resistances. The feeding of the field windings is effected through the accumulator 30, of which one pole is grounded at 31, through regulating means to be described in due course, and through the current leads 32 and 33 leading, respectively, to the slip rings 12 and 13 to which the field windings are connected.

The arrangement of the radially inwardly or outwardly projecting poles of the magnet systems 6, 7 of the motor part and of the generator part on the common magnet yoke 5 (there can of course also be provided exciter windings laid in slots instead of poles proper) gives the advantage that the brushes 10 and 11 both of the generator part and also of the motor part must revolve together with the yoke 5, with the result that the connecting leads from the generator part to the motor part can be stationary, and laid for instance along the brush holders. If an addition there be employed an equal number of poles for the generator and for the motor the yoke can also be made of light construction, since in this case, given suitable arrangement of the parts, the fluxes of the lines of force of the motor and generator parts partly cancel each other out in the common yoke. It is only when the excitation of the motor part becomes negative, (which case is discussed in detail below), that the two fluxes are additive. Since, however, quite a slight negative flux in the motor part produces a great increase in the transmission ratio $n_2:n_1$ of the gearing, it is perfectly sufficient if the common magnet yoke be designed for 1 to 1½ times, and preferably for 1 to 2 times, the magnetic flux of the generator part at full excitation.

The theory of the electric transmission gearing according to the present invention may be explained broadly as follows:

If $C$, $C_1$, $C_2$, and $C_3$ be taken to be constants (which are determined by the design) then the power (L) transmitted by the gearing may be expressed by the following equation:

$$L = C_1 \times n_2 \times M_2$$

$n_2$ being the speed of rotation of the driven shaft and $M_2$ the moment of rotation exerted upon this shaft. This moment of rotation is composed of the torque exerted by the motor part of the gearing upon the common yoke and the torque exerted by the generator part upon the common yoke. If the motor field be designated by $\phi m$, the generator field by $\phi g$, and the current flowing in the armature windings by $J$, then the above equation may also be written as follows:

$$L = C_1 \times n_2 \times J \times (C_2 \times \phi m + C_3 \times \phi g)$$

it being pre-supposed that the direction of $\phi m$ is such that the resulting torque exerted by the motor part upon the common yoke acts in the same direction as the moment of rotation exerted by the generator part upon the common yoke. If $\phi m$ be of reversed polarity, so that the moments of rotation of the motor part and of the generator part upon the common yoke counteract each other, then $\phi m$ is designated as negative.

On the other hand the power ($L_1$) supplied by the driving engine can be represented by the following equation: $L_1 = n_1 \times \phi g \times J \times C_1 \times C_3$.

Disregarding for the time being the losses in the gearing, $L$ is equal to $L_1$, and (provided $\phi g$ be maintained constant) there is obtained the relation $$\frac{n_1}{n_2} = C \times \phi m + 1 \text{ or } \frac{n_2}{n_1} = \frac{1}{(C \times \phi m + 1)}$$

It follows from this relation that the transmission ratio $n_2/n_1$ becomes reduced the greater $\phi m$ is. When $\phi m$ equals 0 the ratio $n_2:n_1$ becomes unity.

If the energy supplied by the driving machine and the speed $n_1$ be kept constant, a certain maximum speed $n_2$ can be obtained for a given load acting on the shaft 2. To this end, however, the transmission ratio must be correctly adjusted by alteration of the excitation of the motor. This can be done automatically, as shown in the drawings representing a form of construction of the transmission gearing according to the invention for use as a gear-box in automobiles.

16 denotes for example a potentiometer resistance the centre of which is grounded at 31', and the two ends of which are connected to the non-grounded pole of the source of current, in the present instance of the accumulator 30. A control rod 17 is coupled by means of links 20 and 21 to the throttle lever 19 of the automobile engine (that is to say to the controlling means for the driving motor), and is provided with two brush contacts 34 which collect the exciting current of the required voltage for the motor part at the potentiometer resistance 16. The joint 22 of the control rods 20, 21 can only move along the curved track 23. The potentiometer resistance is shifted towards the right as $n_2$ increases, which can be effected for example by means of a centrifugal pendulum 18 (centrifugal governor) to the sleeve 35 of which the resistance is secured. At the same time means should be provided to prevent the pair of contacts of the control rod 17 from becoming displaced beyond the ends of the resistance 16. This can be done for instance by means of stops provided at the left and right hand ends of the resistance 16. The spring 27 in the control rods serves to enable the regulating member 19 for the driving motor to be nevertheless displaced still further.

The mode of operation of this regulating arrangement will now be explained with reference to Fig. 2 of the drawings. In this figure the control rod 17 and the sleeve 35 are shown in the positions they occupy when the vehicle is being started up from a standstill, the accelerator or gas pedal 19 being depressed slightly from its no load position so that the internal combustion engine receives a quantity of mixture appropriate to the conditions of starting up from a standstill the pedal 19 being also coupled to the regulating rod 28 leading to the throttle of the carburetor Since the brushing contacts 34 are prevented by abutments from traveling towards the right beyond the ends of the resistance 16 the spring 27 is first tensioned. In this position the brushing contacts of the potentiometer resistance (voltage divider) 16 collect the full voltage of the battery 30 and feed the same to the field winding 7 of the motor part. The motor field $\phi m$ is thus at its maximum, and therefore also $n_2:n_1$ is at its minimum. The conditions are thus the same as when the lowest speed is engaged in the case of wheel transmission gearing.

The Cardan shaft 2 now commences to rotate The driver retains the setting of the pedal 19 for the time being unaltered. As the speed $n_2$ increases the sleeve 35 first moves towards the right, with the result that the resistance 16 is also correspondingly shifted towards the right The brushing contacts 34 only participate in the movement of the resistance up to a certain speed $n_2$, until the spring 27 is de-tensioned, after which they remain motionless as long as the driver does not alter the setting of the pedal 19.

If the output of the driving engine is then still greater than the propelling power at this speed of the Cardan shaft the vehicle will be still further accelerated, that is to say the speed $n_2$ is still further increased, and consequently through the intermediary of the centrifugal governor 18, the sleeve 35, and with it the resistance 16, is still further displaced towards the right while the brushing contacts 34 remain unaffected. These contacts consequently pick up a lower voltage at the potentiometer resistance 16, with the result that the excitation of the motor part is reduced. This however implies an alteration of the transmission ratio $n_2:n_1$ in the sense of increasing this ratio. The displacement of the resistance 16 comes to an end when equilibrium becomes established between the output of the driving engine (with the setting of the pedal 19 still unaltered) and the propelling power, which corresponds to the terminal speed $n_2$.

If the driver now desires to still further increase the speed of travel he depresses the pedal 19 further. In doing so he on the one hand by operation of the regulating rod 28, gives the engine more gas with the result that its output is increased, and on the other hand, through the intermediary of the control rods 20, 21, and 17, displaces the position of the brushing contacts 34 towards the right, while the potentiometer resistance remains unaltered as to its position since the velocity of the vehicle can not have become suddenly altered. By displacement of the brushing contacts 34 towards the right there is brought about an increase in the excitation of the motor part 7, which in its turn implies a decrease in the transmission ratio $n_2:n_1$. Since the speed $n_2$ can not suddenly change the speed $n_1$ increases. Increased charging of the driving engine by the operation of the throttle control rod 28, together with the positively increased speed $n_1$ of this engine, result in greater driving output which accelerates the vehicle. The speed $n_2$ is thus increased, the sleeve 35 is shifted further towards the right, and with it the resistance 16, so that the excitation of the motor part is weakened again, until equilibrium is again established between propelling power and engine output.

According to the above, the transmission ratio $n_2:n_1$ at any one time is conditioned by the relative position of the resistance 16 and pair of contacts 34, the position of the resistance being dependent on the speed $n_2$, and the position of the contacts 34 on the setting of the pedal 19 and therefore on the degree of charging of the driving engine. By suitable construction on the one hand of the control rods 19, 20, 22, 23, 21, 17, and on the other hand if desired of the arrangement of rods for displacing the resistance 16 in dependence on the centrifugal governor 18, it is possible to ensure that the position of the brushing contacts 34 relatively to the resistance 16 shall always become so adjusted, in the condition of equilibrium, that certain conditions are automatically fulfilled.

An alteration in the shape of the guide curve 23 results for example in alteration of the degree of charging of the driving engine, and its speed of rotation without alteration of the propelling power and velocity of travel, so that this engine has the same output but a different degree of efficiency. Thus, for example, by suitable shaping of the guide curve 23, it becomes possible at will to ensure the fulfillment of certain pre-conditions as regards efficiency, rate of acceleration, and the like.

The conditions at starting the vehicle from a standstill are as follows: As already pointed out, the generator field is normally always excited up to the maximum limit. When the vehicle is standing still, i. e. when the speed $n_2=0$, the motor part of the gearing does not yet generate any counter electromotive force. On the other hand the driving engine has a speed $n_1$ as a result of which, when the generator excitation is started, there is set up in the generator part an electromotive force which is counteracted only by the ohmic resistance of the armature windings. The current thus increases disproportionately, so that the resulting Joule effect would be greater than the driving output of the gasoline engine. This would result in stopping the engine and preventing starting of the vehicle. If however the generator excitation be weakened, for the purpose of starting, the current in the armature windings does not increase to such a pitch, and the resulting Joule effect remains less than the output of the driving engine, and the latter can consequently keep up its speed. The current induced in the armature windings produces a powerful torque which accelerates the velocity of the vehicle. The counter electromotive force of the motor part thereby begins to take effect. To the same extent the generator excitation can be strengthened again, so that it regains its full value before the actual regulation of the transmission ratio, as described above, commences.

Figure 2:
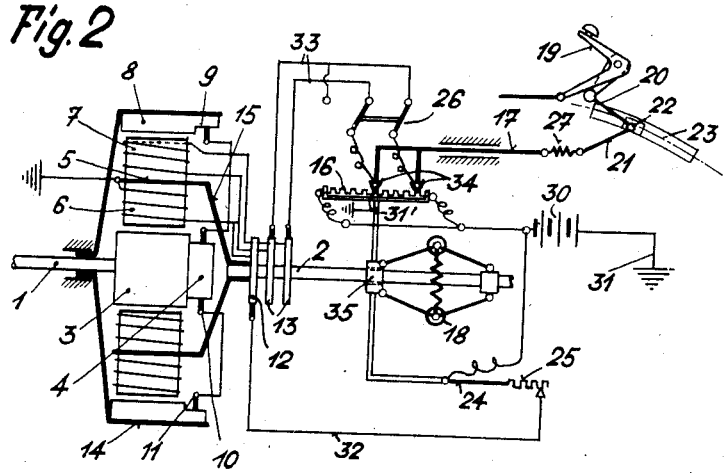
Fig. 2 is a diagram of connections.

The weakening of the generator field at starting may also be effected automatically, as shown in Fig. 2, by means of the regulating rod 24 in dependence on the centrifugal governor 18 and the resistance 25. As the speed $n_2$ increases, the sleeve 35 becomes displaced towards the right, and with it the resistance 25 is also shifted towards the right so that at a certain speed $n_2$ the resistance 25 is completely cut off. The size of this resistance can easily be computed.

As already mentioned, the direction of rotation of the shaft 2 is opposed to the direction of rotation of the shaft 1 when the part of the gearing acting as a motor is excited powerfully but with reversed polarity. For this purpose there is interposed for example a pole reverser 26 in the lead 33 to the exciting winding of the part acting as a motor.

Figure 4:
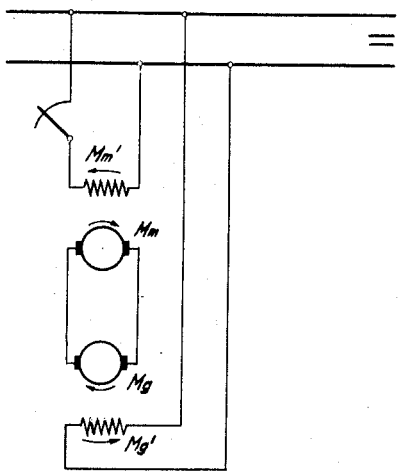
Fig. 4 is a simplified diagram of connections of the gearing in the normal condition.

With the aid of the described device it is also possible to start up the driving engine. Fig. 4 shows the arrangement of connections for the normal working of the gearing according to the present invention. $Mm'$ and $Mg'$ denote the torques exerted upon the communal yoke, while $Mg$ is the torque of the driving shaft and $Mm$ the torque taken up by the fixed casing. In this case the torques exerted on the mechanically coupled field windings connected to the driven shaft are additive.

Figure 5:
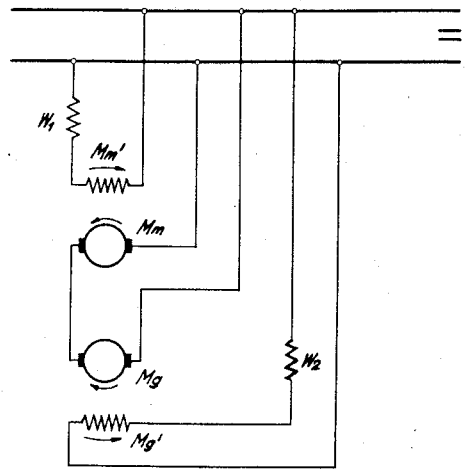
Fig. 5 is a similar diagram of connections of the gearing when used to start up the driving engine with current from a battery.

Fig. 5 shows an arrangement of connections with the aid of which the driving engine can be started up by the gearing operated from a battery, without the exertion of torque upon the Cardan shaft. The direction of the exciting current, and the magnitude of the resistances $w_1$ and $w_2$, are such that the torques $Mm'$ and $Mg'$ exerted upon the common yoke counteract each other and are of the same magnitude. The torque $Mm$ is taken up by the stationary casing. There thus remains the equally powerful but opposite torque $Mg$ which turns over and starts up the driving engine.

The gearing according to the present invention also acts as transmission gearing, as already described, when energy is to be transmitted in the opposite direction, from the shaft 2 to the shaft 1. This is the case when the driving engine is to be used as a motor brake. In this case the motor part assumes the function of the generator and the generator part the function of the motor. The latter compels the setting up of a speed $n_1$ which is higher than the speed $n_2$, so that the internal combustion engine takes over and destroys the braking energy. The transmission ratio $n_2:n_1$ is again adjusted by alteration of the excitation $\phi m$. Thus, the greater the field $\phi m$ the more powerful the braking action of the engine, since the latter is thereby compelled to run correspondingly faster than the Cardan shaft.

Figure 3:
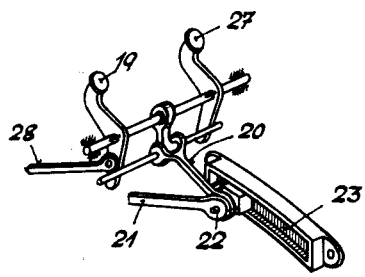
Fig. 3 shows a detail in perspective.

There are various constructional possibilities for effecting increase in the motor excitation $\phi m$ for braking purposes, without at the same time giving the driving engine more gas. Fig. 3 shows by way of example one such possibility. The pedal 19 is adapted to actuate both the system of regulating rods 20, 22, 21 for the brushing contacts 34 and also the control rod 28 for the carburetor. The pedal 27 on the other hand operates only the system of rods 20, 22, 21 for the brushing contacts 34 and not the rod 28 for the carburetor. The pedal 27 thus serves for braking, while the pedal 19 represents the accelerator or gas pedal in the hitherto usual sense of the term.

The above described automatic control of the transmission ratio is not only applicable to electric transmissions. It can also be appropriately applied to all transmission gearing with gradual variation of the transmission ratio.

I claim:

1. In electric transmission gearing a driving motor, a driving shaft coupled with the said motor, a driven shaft, two direct current electric machines with separate excitation, the one part of the first of the said machines being coupled to the said driving shaft and the other part of said first machine to the said driven shaft, the one part of the second of the said machines being coupled to the driven shaft and the other part of said second machine being stationary, a field winding on the one of the parts of the said second machine, the armature windings of both the said machines constituting a closed current circuit, an ohmic resistance and a source of current interposed in the circuit of the field winding of the said second machine, means for varying the said resistance, a regulating device for varying the output of the said driving motor, the said regulating device being operatively connected with the said means for varying the resistance so as to make said resistance smaller when the output becomes greater and vice-versa, and a controlling device connected with the said driven shaft for controlling the speed of rotation of said driven shaft, the said controlling device being operatively connected with the said resistance varying means, so as to make the said resistance greater when the speed of rotation increases and vice-versa, both the said operations of these means being adapted to influence and cancel each other.

2. In electric transmission gearing a driving motor, a driving shaft coupled with the said motor, a driven shaft, two direct current electric machines with separate excitation, the one part of the first of the said machines being coupled to the said driving shaft and the other part to the said driven shaft, an exciting current circuit comprising a field winding on the one of the said parts of the said first machine, the one part of the second of the said machine being coupled to the driven shaft and the other part of the said second machine being stationary, the armature windings of both the said machines constituting a closed current circuit without the interposition of resistances, and, for the generation of a powerful starting torque a current source and an ohmic resistance interposed in the said exciting current circuit of the said first machine, means for altering and cutting out this resistance, and a controlling device connected with the said driven shaft controlling the speed of rotation of the said driven shaft, the said controlling device being operatively connected with the said means for alterating and cutting out the said resistance in the sense of reducing and cutting out the said resistance completely as the speed of rotation increases from zero to a certain minimum value.

3. In electric transmission gearing two direct current electric machines with separate excitation, the armature of the first of the said machines being coupled to the driving shaft of the said gearing, the armature of the second of the said machines being stationary, the field magnet systems of both the said machines being mounted on a common yoke and coupled to the said driven shaft, a source of current, switching means for switching the said current source into the current circuit formed by the armature windings of the said two machines, means for adjusting the excitation of both the said machines to such a value that the moments of rotation of the armature of the first and second of the said machines on the common yoke of the magnet systems just cancel each other out, for the purpose of starting up the driving motor from the said source of current.

4. In electric transmission gearing a driving motor, a driving shaft coupled with the said motor, a driven shaft, two direct current electric machines with separate excitation, the one part of the first of the said machines being coupled to the said driving shaft, the other part of the said first machine being coupled to the said driven shaft, the one part of the second of the said machines being coupled to the driven shaft and the other part of the said second machine being stationary, the armature windings of both the said machines constituting a closed current circuit, an exciting current circuit comprising a field winding on the one of the parts of the said second machine, an ohmic resistance and a source of current interposed in the said exciting current circuit of the said second machine, means for varying the said resistance, a regulating device for varying the output of the said driving motor, the said regulating device being operatively connected with the said means for varying the resistance so as to make said resistance smaller when the output becomes greater, and vice-versa, a controlling device connected with the said driven shaft for controlling the speed of rotation of the said driven shaft, the said controlling device being operatively connected with the said resistance varying means, so as to make the said resistance greater, when the speed of rotation increases and vice-versa, both the said operations of these means being adapted to influence and cancel each other, and a second regulating device adapted to alter the said resistance interposed in the said exciting current circuit of the said second machine independently of any alteration in the output of the driving motor, for the purpose of exerting a braking action upon the said driven shaft by powerful excitation of the field of the said second machine.

KARL HEFEL.